US011093798B2

(12) United States Patent
Torres et al.

(10) Patent No.: US 11,093,798 B2
(45) Date of Patent: Aug. 17, 2021

(54) AGILE VIDEO QUERY USING ENSEMBLES OF DEEP NEURAL NETWORKS

(71) Applicant: Palo Alto Research Center Incorporated, Palo Alto, CA (US)

(72) Inventors: Francisco E. Torres, San Jose, CA (US); Hoda Eldardiry, San Carlos, CA (US); Matthew Shreve, Mountain View, CA (US); Gaurang Gavai, Sunnyvale, CA (US); Chad Ramos, Chicago, IL (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 258 days.

(21) Appl. No.: 16/235,743

(22) Filed: Dec. 28, 2018

(65) Prior Publication Data

US 2020/0210780 A1 Jul. 2, 2020

(51) Int. Cl.
| | |
|---|---|
| *G06K 9/62* | (2006.01) |
| *G06F 16/783* | (2019.01) |
| *G06N 20/20* | (2019.01) |
| *G06F 16/738* | (2019.01) |
| *G06F 16/73* | (2019.01) |
| *G06K 9/00* | (2006.01) |
| *G06N 3/04* | (2006.01) |
| *G06N 3/08* | (2006.01) |

(52) U.S. Cl.
CPC ........... *G06K 9/6263* (2013.01); *G06F 16/73* (2019.01); *G06F 16/738* (2019.01); *G06F 16/783* (2019.01); *G06K 9/00718* (2013.01); *G06K 9/6215* (2013.01); *G06K 9/6254* (2013.01); *G06N 3/0454* (2013.01); *G06N 3/08* (2013.01); *G06N 20/20* (2019.01); *G06K 2009/00738* (2013.01)

(58) Field of Classification Search
CPC ............ G06K 9/6263; G06K 9/00718; G06K 9/6215; G06K 9/6254; G06K 2009/00738; G06F 16/783; G06F 16/738; G06F 16/73; G06F 16/75; G06N 20/20; G06N 3/0454; G06N 3/08
USPC ............................................... 382/156; 707/6
See application file for complete search history.

(56) References Cited

U.S. PATENT DOCUMENTS

| | | | |
|---|---|---|---|
| 9,053,115 B1 | 6/2015 | Rosenberg et al. | |
| 9,836,641 B2 | 12/2017 | Philbin et al. | |

(Continued)

FOREIGN PATENT DOCUMENTS

WO 2018040059 A1 3/2018

OTHER PUBLICATIONS

European Search Report from EP Application No. 19219908.1 dated May 6, 2020, 7 pages.

(Continued)

*Primary Examiner* — Charlotte M Baker
(74) *Attorney, Agent, or Firm* — Mueting Raasch Group

(57) ABSTRACT

A method includes receiving a user object specified by a user. A similarity score is computed using a similarity function between the user object and one or more candidate objects in a database based on respective feature vectors. A first subset of the one or more candidate objects is presented to the user based on the respective computed similarity scores. First feedback is received from the user about the first subset of candidate objects. The similarity function is adjusted based on the received first feedback.

21 Claims, 9 Drawing Sheets

(56) References Cited

U.S. PATENT DOCUMENTS 10,628,683 B2* 4/2020 Doumbouya ...... G06K 9/00268
2004/0181527 A1* 9/2004 Burdick ................ G06F 16/285

OTHER PUBLICATIONS

Ansari e al., "Content Based Video Retrieval Systems, Methods, Techniques, Trends and Challenges", International Journal of Computer Applications, Feb. 7, 2015, pp. 13-22.
Chen et al., "An Integrted Approach to Video Retrieval", Advances in Ontologies, Autstralian Computer Society, 2008, pp. 49-55.
Yu et al., "Strategies for Searching Video Content with Text Queries or Video Examples", arxiv.org, Jun. 18, 2016, 1 page.
Shreeve et al., U.S. Appl. No. 15/826,588, filed Nov. 29, 2017.
Bulan et al., "Segmentation and Annotation-Free License Plate Recognition with Deep Localization and Failure Identification", IEEE Trans Intelligent Transportation Systems, Jan. 2017, pp. 1-13.
Hankey et al., Description of the SHRP 2 Naturalistic Database and the Crash, Near-Crash, and Baseline Data Sets Task Report, Apr. 2016. 58 pages.
Mo et al., "A Joint Sparsity Model for Video Anomaly Detection", 2012 Conference Record of the 46th Asilomar Conference on Signals, Systems, and Computers, 2012, pp. 1969-1973.
Osman et al., "A Bi-Level Methodology for Identification of Types of Secondary Tasks from Observed Driving Behavior Data: Application of Ensemble Tree Machine Learning Algorithms on SHRP 2 NDS Data", Transportation Research Board 97th Annual Meeting, Jan. 7-11, 2018.
Rakha et al., "A Simplified Behavioral Vehicle Longitudinal Motion Model", Transportation Letters, vol. 1, Issue 2, 2009, pp. 95-110.
Rakha et al., "Calibrating Steady-State Traffic Stream and Car-Following Models using Loop Detector Data", Transportation Science, 2009.
Rakha et al., "Validation of Van Aerde's Simplified Steadystate Car-Following and Traffic Stream Model", Transportation Letters 1 (3), 2009, pp. 225-242.
Sangster et al, "Application of Naturalistic Driving Data to Modeling of Driver Car-Following Behavior", Transportation Research Record, Journal of the Transportation Research Board, 2013, pp. 20-33.
Satzoda et al., "Drive Analysis using Lane Semantics for Data Reduction in Naturalistic Driving Studies", 2014 IEEE Intelligent Vehicles Symposium IV, Jun. 8-11, 2014, pp. 293-298.
Van Aerde et al., "Multivariate Calibration of Single Regime Speed-Flow-Density Relationships", Proceedings of the 6th 1995 Vehicle Navigation and Information Systems Conference, 1995, 8 pages.
Van Aerde et al., "Single Regime Speed-Flow-Density Relationship for Congested and Uncongested Highways", 74th TRB Annual Conference, 1995.
Van Aerde et al., "Integration: An Overview of Traffic Simulation Features", 1996 Transportation Research Board Annual Meeting, 15 pages.
Wang et al., "Temporal Segment Networks: Towards Good Practices for Deep Action Recognition", Aug. 2, 2016, 16 pages.
Wu et al., "Derivation of Van Aerde Traffic Stream Model from Tandem-Queuing Theory", Transportation Research Record, Transportation Research Board 88th Annual Meeting, Jan. 11-15, 2009, 27 pages.

* cited by examiner

Reference Video Clip ?

What Set does the reference video exist in?

510 — sample video

Reference Video:

515 — DowntownBrooklynDrive_480p

520 — Reference Time: 00:03:51

| 0 | 3 | 51 |
| Hour | Min | Sec |

Query name:

525 — sample query

Search Set To Query Against: ?    535 — Max Matches: ?

530 — sample video    24

Notes: ?

540 — This is an example of how to use the Video Query application.

Submit

FIG. 5A

AGILE VIDEO QUERY USING ENSEMBLES OF DEEP NEURAL NETWORKS

GOVERNMENT FUNDING

This invention was made with Government support under contract DTFH6115H00006 FHWA-EARP-Hwy_Safety. The Government has certain rights to this invention.

TECHNICAL FIELD

The present disclosure is directed to video processing and particularly to video dataset querying.

BACKGROUND

Searching datasets for objects that are similar in some manner can be useful in many applications. Searching may be accomplished by classifying all objects in a dataset up front, and then searching for the class of interest. However, this approach requires the classes to be known upfront and includes significant upfront investment in labeling data and training models.

SUMMARY

Embodiments described herein involve a method comprising receiving a user object specified by a user. A similarity score is computed using a similarity function between the user object and one or more candidate objects in a database based on respective feature vectors. A first subset of the one or more candidate objects is presented to the user based on the respective computed similarity scores. First feedback is received from the user about the first subset of candidate objects. The similarity function is adjusted based on the received first feedback.

Embodiments involve a system comprising a processor and a memory storing computer program instructions which when executed by the processor cause the processor to perform operations comprising receiving a user object specified by a user. A similarity score is computed using a similarity function between the user object and one or more candidate objects in a database based on respective feature vectors. A first subset of the one or more candidate objects is presented to the user based on the respective computed similarity scores. First feedback is received from the user about the first subset of candidate objects. The similarity function is adjusted based on the received first feedback.

Embodiments involve a non-transitory computer readable medium storing computer program instructions, the computer program instructions when executed by a processor cause the processor to perform operations comprising receiving a user object from a user. A similarity score is computed using a similarity function between the user object and one or more candidate objects in a database based on respective feature vectors. A first subset of the one or more candidate objects is presented to the user based on the respective computed similarity scores. First feedback is received from the user about the first subset of candidate objects. The similarity function is adjusted based on the received first feedback.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

FIG. 5A shows an example graphical user interface for performing an agile video search in accordance with embodiments described herein;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
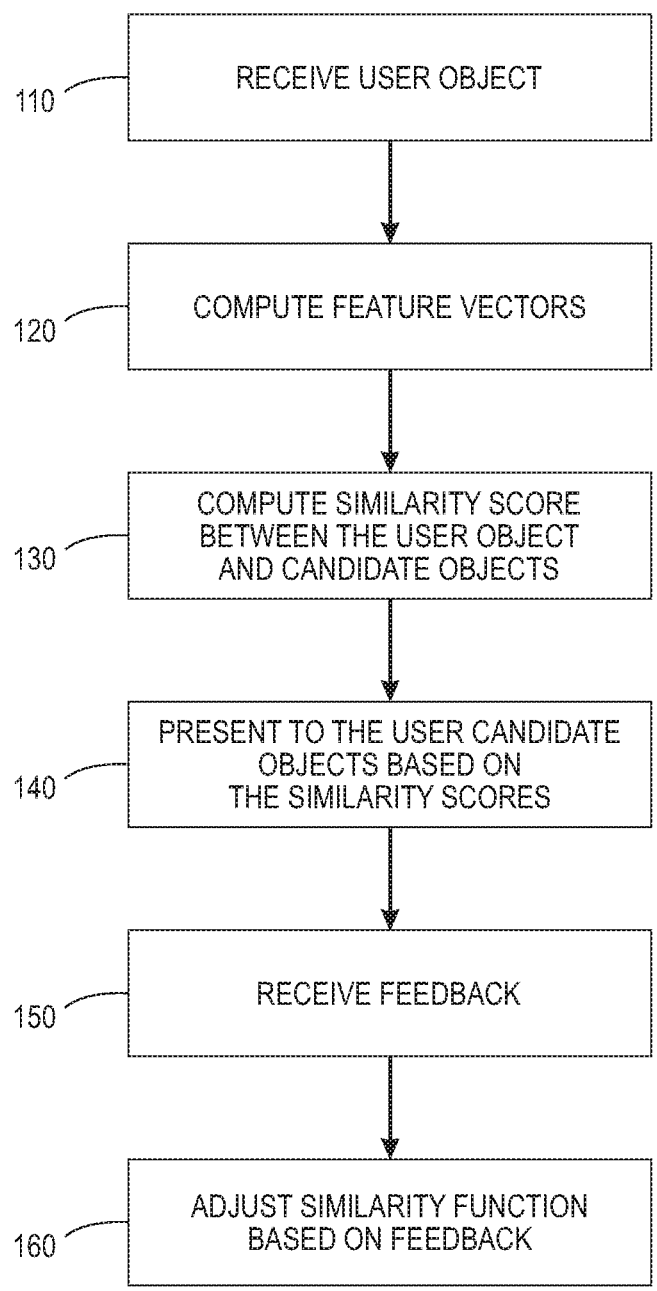
FIG. 1 shows a process for an agile object search in accordance with various embodiments described herein.

Using embodiments described herein, users can perform an agile, collaborative, and/or evolving query of a dataset for objects that are similar to one or more provided examples without the expense and time needed for conventional human labeling of training data and conventional computer vision based supervised machine learning. Instead, deep neural network representations of objects in the dataset are computed using pre-trained deep neural networks, and then queries are performed on these representations. In this description, "pre-trained deep neural networks" are deep neural networks trained previously on some task other than the task at hand. State-of-the-art practice in deep learning has shown that representations from deep neural networks trained in one context are often useful in different contexts, and embodiments described herein takes advantage of this property of deep neural networks. As an exemplary embodiment, this invention can use deep neural networks trained on the UCF101 Action Recognition Data Set (Khurram Soomro, Amir Roshan Zamir and Mubarak Shah, UCF101: A Dataset of 101 Human Action Classes From Videos in The Wild, CRCV-TR-12-01, November, 2012) to perform queries for actions that are not one of the 101 classes in the UCF101 dataset.

Embodiments described herein involve a structured way to store and search through deep neural network representations of user objects such as video clips, images, and/or text, using a similarity function. Converting unstructured data into this structured representation allows a faster, more powerful, and a more automated search. Embodiments described herein involve computing signatures of objects using pre-trained deep learning neural networks and provisioning the signatures in a structured database. The signatures can then be used to compute a similarity score with a user object. This allows a user to perform database queries for objects that are similar to the provided examples based on the similarity function.

Embodiments described herein only require a limited set of examples upfront, often only one example. The effort spent by a user on reviewing query results only needs to increase as a user iterates to, focuses down on, and validates a particular search concept. The user can adapt and redirect a search effort based on new insights learned during iterations with the algorithm, using embodiments described herein. Embodiments described herein enable agile browsing through a large dataset in order to discover and focus on relevant data in a dynamic and interactive way.

Embodiments described herein may combine unsupervised clustering with agile video querying to enable learning from labeled and unlabeled data with significantly less user involvement as compared with current approaches. For example, a transportation professional, e.g. a traffic engineer, can create and validate a vehicle-following model that uses a limited set of labeled examples.

The user can provide one or a small number of reference examples of an action when executing the search without being limited to a predetermined list of actions. A valuable aspect of embodiments described herein is that they work for actions that are not specified when the deep neural network models are trained. Accordingly, embodiments described herein avoid the approach of performing standard computer vision-based machine learning on the raw, unstructured data itself each time new actions are investigated. Thus, it can drastically reduce the amount of manual viewing of video required for research with large video datasets, enabling broader and deeper studies at lower cost.

FIG. 1 shows a process for an agile object search in accordance with various embodiments described herein. Prior to performing the search, deep learning feature vectors are computed for each object of a plurality of objects in a dataset, and these feature vectors are stored in a structured database. In this context, a deep learning feature vector is a vector of numbers output from a layer in a deep neural network. In certain embodiments, the deep learning feature vectors comprise a plurality of triplets, the triplets representing three versions of a deep neural network that were trained on three different data splits. For each pre-trained deep neural network, computing the embedded features may be done once for a dataset and stored in a database, rather than re-computing each time a new search is being performed for a new set of actions, for example. Herein, the set of computed feature vectors for a given object is sometimes called the signature of the object.

Some deep learning models comprise two or more streams, each stream comprising a particular type of neural network. A recent example of a two-stream architecture is provided by L. Wang, et al. (Wang, Limin, et al. "Temporal segment networks: Towards good practices for deep action recognition." European Conference on Computer Vision. Springer, Cham, 2016). A stream is a deep neural network model that uses video data processed in a certain way. For example, RGB frames extracted from a video could be used to train a RGB stream, optical flow computations of a video could be used to train an optical flow stream, and warped optical flow could be used to train an alternative form of an optical flow stream. In general, any pre-processing of video, not just optical flow computations, could be used to generate input of a separate stream, other examples including filtering out known or expected noise, background subtraction, spectral analysis, mean shift, cam shift, and/or optical flow variants, for example.

In some embodiments, representations from one or more deep neural network stream types can be used. The pre-trained deep neural network streams do not need to have been trained together. A portion of a pre-trained deep neural network can be extracted and used in some embodiments. In some cases the extracted portion is still referred to as a pre-trained neural network, even though it was trained as part of a larger model.

In FIG. 1, a user object 110 is received from a user using a user interface. Feature vectors are computed 120 for the user object. A similarity score is computed 130 between the user object and one or more candidate objects in a database based on the respective feature vectors. According to various embodiments, computing the similarity score comprises determining dot products of respective feature vectors of candidate and user-provided example objects, and normalizing by the square of an appropriate norm of the latter, an example being the well-known Euclidean norm. A first set of the subset of candidate objects are presented 140 to the user based on the respective computed similarity scores. First feedback about the first set of candidate objects is received 150 from the user. The function used to compute similarity scores is adjusted 160 based on the received first feedback.

The process described in FIG. 1 may be configured to be used in the transportation industry. In this example, the video that the user provides may be a forward-looking video clip of a vehicle following a large truck. The user receives back a small sample of possible matches, and after inspecting these candidates, the user provides feedback by scoring the results. The user may request a refined search. The refined search returns a new sample of candidate objects that reflects the scoring in the previous round. After enough iterations are conducted to satisfy the user, the final object search criterion is used to retrieve all matches in the dataset of interest. The user may determine when enough iterations have been completed. In some cases, the number of iterations is a predetermined value. Following up on the above example, the user may modify the search concept as the iterative agile querying takes place. For example, final returned matches could be video clips of a vehicle following a large truck when they are on a multi-lane road and traffic is moving at better than stop-and-go speeds.

Figure 2:
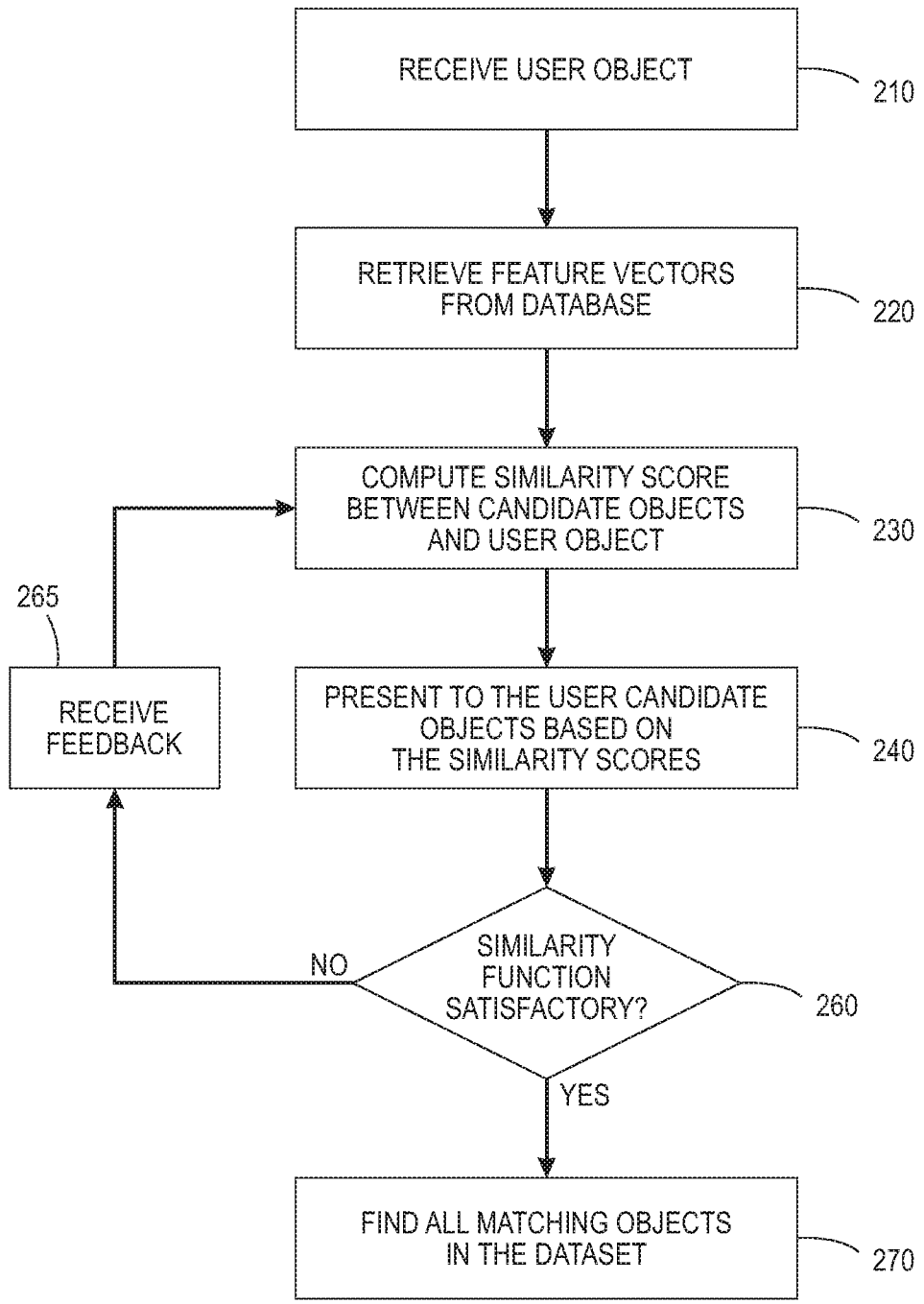
FIG. 2 illustrates another process for an agile object search in accordance with various embodiments described herein.

FIG. 2 illustrates another process for an agile object search in accordance with various embodiments described herein. Prior to performing the search, deep learning feature vectors are computed for each object of a plurality of objects in a dataset, and these feature vectors are stored in a structured database. A user object 210 is received from a user. In 220, the feature vectors needed for the user object are obtained from a structured database that contains pre-computed feature vectors. A similarity score is computed 230 between the user object and one or more candidate objects in a database based on the respective feature vectors. A first set of the subset of candidate objects are presented 240 to the user based on the respective computed similarity scores.

It is determined 260 whether the similarity function is performing satisfactorily. This may be based on a predetermined event occurring. For example, the user may request that the iterative improvement of the similarity function finish because the user is satisfied that a large enough percentage of the objects presented in 240 are sufficiently similar to the user object. If it is determined that the similarity function needs further improvement, the user gives feedback 265 on the latest set of candidate objects that were presented to the user. The similarity function is adjusted based on the received feedback and similarity scores are recomputed. A new set of candidate objects are presented 240 to the user. In some cases, the new set of candidate objects overlaps with the first set of candidate objects. According to various implementations, the new set of candidate objects is substantially the same as the first set of candidate objects and the system determines that convergence has occurred. For example, if the percentage of the new set of candidate objects that are validated by the user as satisfactorily similar is the same, or nearly the same, as the percentage for a previously selected set of candidate objects, the system may determine that convergence has occurred. If it is determined that convergence has occurred, it may be determined 260 that the similarity function is performing satisfactorily. If it is determined 260 that the similarity function is not performing satisfactorily, the process continues. When it is determined 260 that the similarity function is performing satisfactorily, the system finds 270 all matching objects in the dataset using the satisfactory similarity function from 260. The matching objects may be stored and/or presented to the user. The iterative process that is completed with the user may only use a subset of the objects in the dataset. According to various embodiments, the system finds all matching objects in the entire dataset. In some cases, the system finds all matching objects in a subset of the dataset.

Figure 3:
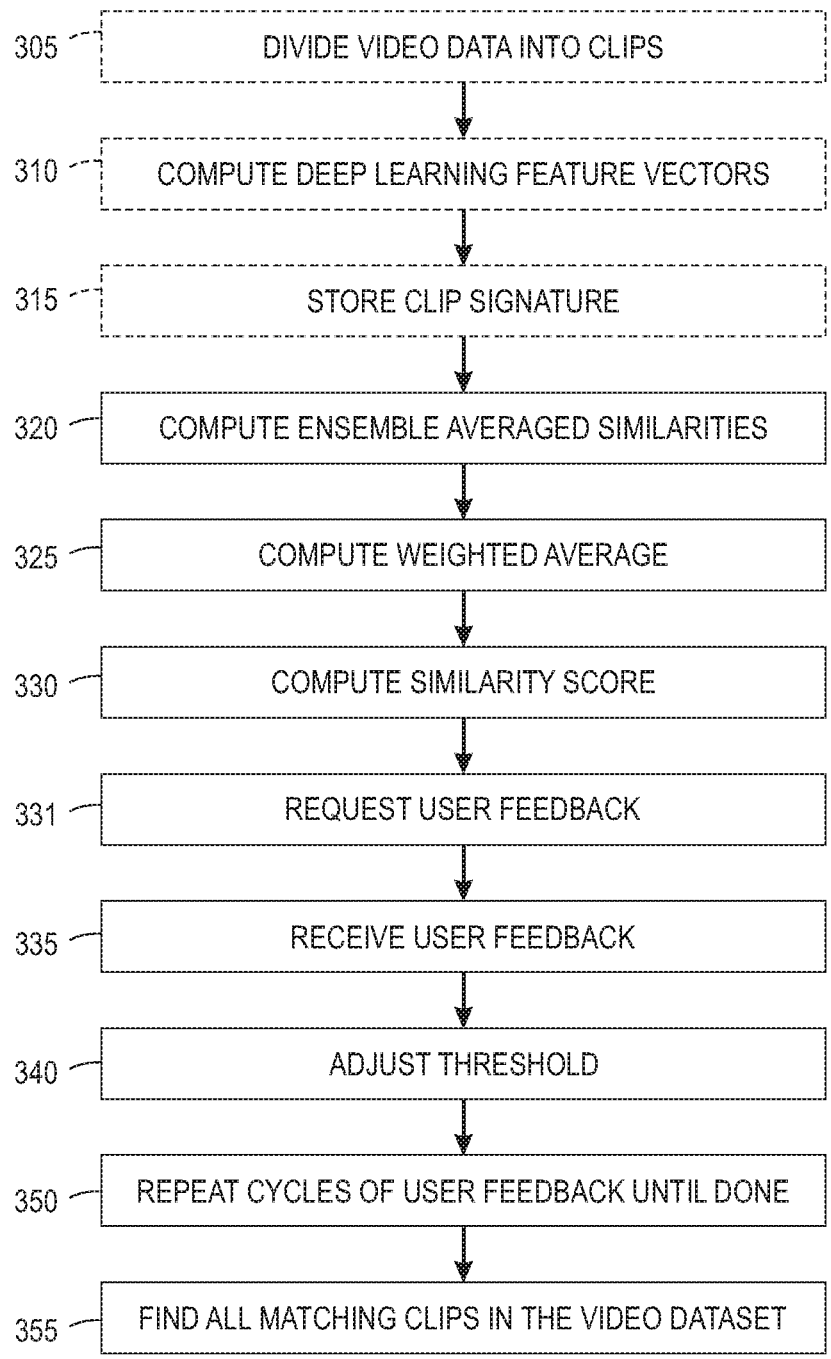
FIG. 3 shows a more detailed process for an agile object search in accordance with embodiments described herein.

According to various embodiments described herein, the object may be any data element that can be reviewed by a user. For example, the object may include one or more of a video clip, an image and a text object. The object may include combinations of data elements in some embodiments. For example, the object may include a video clip and associated text object and/or an image with an associated text object. While embodiments described herein may be described in conjunction with an agile video search, it is to be understood that the user object can be any data element that can be reviewed by a user as described above. FIG. 3 shows a detailed process for an agile video search in accordance with embodiments described herein. For at least a subset of videos in a video dataset, the video data is processed prior to beginning a search. Processing of video data comprises dividing 305 each video in the subset into clips. At least some of the video data in the dataset may be in the form of video clips. Thus, dividing the video data into clips may not be necessary. Deep learning embedded feature vectors for each of the clips are computed 310. According to various embodiments, the deep learning embedded feature vectors are computed as triplets. The set of feature vectors may be referred to herein as the clip signature. According to various embodiments, the clip signature is stored 315 in a structured database.

During the search, for at least a subset of the video clips in the video dataset, ensemble averaging is used to compute similarities 320 in relation to a user reference clip. The user reference clip may include an action of interest to the user, such as a forward-looking video clips of a vehicle following a large truck as described above.

As a first step in preparing an ensemble average over streams, splits, and/or feature names, individual similarities are computed using Equation 1.

$$S(V_{candidate}, V_{ref} \mid \text{stream, training split, feature name}) = \frac{V_{candidate} \cdot V_{ref}}{\|V_{ref}\|_2^2} \quad (1)$$

Here, $V_{candidate}$ represents a specific feature vector in the candidate clip signature, $V_{ref}$ represents the corresponding feature vector in the signature of the reference clip, and the stream, training split, and feature name identify the feature vector on which Equation 1 is operating. The numerator of Equation 1 is a dot product of the feature vectors for the candidate and the reference. As can be appreciated by those with an understanding of dot products, Equation 1 extracts the part of $v_c$ that is in the direction of $v_r$ and then computes how similar it is to $v_{ref}$.

In some embodiments there are feature vectors for multiple training splits in a signature, and in those cases it may be preferred to compute an ensemble average of S ($\sigma$) over all training splits for each stream and feature name pair. In embodiments with only a single stream and a single feature name, $\sigma=1$ is considered a perfect match.

For embodiments with multiple streams and/or feature names, the ensemble averages $\sigma$ undergo another ensembling. For example, a weighted average (R) over all streams and feature names may be computed 325 as shown in Equation 2. In this equation, w represents a weight for each {stream, feature name} pair that is adjusted in each iteration on the similarity function.

$$R = \frac{\Sigma w^2 * (1-\sigma)^2}{\Sigma w^2} \quad (2)$$

For the purpose of clarity, the sum in Equation 2 is over the {stream, feature name} pairs, and the values of $\sigma$ and w for any one pair may be different than the values for other pairs. A similarity score is computed 330 for each candidate clip using the weighted average as shown in Equation 3.

$$\text{Score}=1-\sqrt{R} \quad (3)$$

Those familiar with computing distances in coordinate systems will readily appreciate that Equation 3 represents a "distance" from the point where all $\sigma$ equal 1, in a coordinate system where each {stream, feature name} "coordinate dimension" has its own weight w. As stated above, for each {stream, feature name} pair, $\sigma=1$ is the ideal value, and when all $\sigma$ equal 1, R from Equation 2 equals 0, and therefore Score in Equation 3 equals 1. Thus, Equations 2 and 3 represent a possible ensembling that behaves in a desirable way. The set of w values in Equation 3 quantify the importance for each {stream, feature name} dimension, and these values can be learned as part of learning a satisfactory similarity function.

User feedback is requested on at least a subset of the candidate clips. According to various embodiments, user feedback is requested 331 based on the similarity score. For example, similarity scores above a current threshold may trigger a user feedback request to validate or invalidate whether the candidate clip exhibits a desired concept. In some cases, similarity scores less than the current threshold and greater than some lower limit may also trigger the user feedback request. The purpose of these requests is for the algorithm to get feedback on clips it considers to be a "near miss". A user could give feedback that a computed near miss is actually a clip that matches the desired concept, for example. Feedback for both computed matches and computed near misses can be useful. Getting feedback from the user is how the validities of the computed matches and near misses are evaluated, in the context of the user's desired query outcome.

User feedback is received 335 on at least a portion of the subset of candidate clips. The threshold may be adjusted 340 based on the received user feedback, as part of adjusting the similarity function. Requesting 331 user feedback, receiving 335 user feedback, and adjusting 340 the similarity function, by adjusting either the weights w or the threshold or both, may be iteratively repeated 350 until a predetermined event occurs. In some cases, the predetermined event includes receiving user input that finalizes the process. The predetermined event may be a predetermined number of cycles reached and/or a determination that convergence has occurred, for example. Once the predetermined event has occurred, the final weights and score threshold are used to find all matching clips in the video dataset. The user is therefore able to get the query result for the entire dataset, after only having to review and give feedback on a smaller number of clips. For example, a query can be considered to perform well when >50% of the clips in the final query result are considered by the user to be valid matches to the intended search concept.

According to various embodiments, one or more additional criteria may be used to filter candidate clips before or after the processes described herein. For example, if a time of day is of interest, filtering by time of day can be done by using a timestamp on the video. In some cases, the candidate clips are filtered by using a predetermined classifier, such as a daylight versus nighttime video classifier or an object classifier that looks for the presence of one or more particular objects, for example. Such classifiers are known in the practice of machine learning, including deep learning. According to various embodiments, candidate clips may be filtered according to acceleration of vehicles in the clip, when ancillary data for the acceleration is available, or acceleration is computed using known computer vision methods. For example, the system may only return candidate clips that are within a predetermined acceleration range. Candidate clips may be filtered based on a correlation between two video streams. For example, consider the case of two time-stamped video streams of some activity acquired from two different cameras, such as a first camera observing the outside of a store and a second camera observing customer movement inside a store. A user may want to perform agile video queries in order to learn what activities outside a store correlate with either desirable or undesirable activity inside a store.

According to various implementations, the candidate clip search may be divided into two or more searches when the user feedback is suggesting that the user is actually interested in two or more distinct concepts. Various techniques may be used to determine whether the user feedback is suggesting that the user is actually interested in two or more distinct concepts. For example, K-L divergence, multiple Gaussian analysis, and/or divergence observed from hierarchical clustering, all of which are known methods of analysis in the practice of machine learning, may be used to identify when it makes sense to reorganize a query into two separate queries. These techniques may analyze whether the data for user feedback on candidate clips is exhibiting signs of more than one mode, with respect to the deep learning feature vectors as the dependent variables. If the likelihood of more than one query mode is high enough, the user could be prompted to reorganize the query into two or more queries. In other embodiments, the reorganization is done automatically when triggered by the likelihood being greater than some predetermined threshold.

After final results of a query have been delivered, in some cases it can be useful to further analyze the results by analyzing the signatures of the matching clips. For example, such an analysis may help to group the matching clips, or it may help to identify anomalies. In embodiments, the final results may be clustered using the signatures for clips returned at the end of the agile query, by employing techniques known in the art of machine learning and data science to cluster in a feature space. Clustering can be performed on the embedded features of all the matching clips. In some cases, the user may semantically label the clusters to further study patterns and distinctions in the data.

Figure 4:
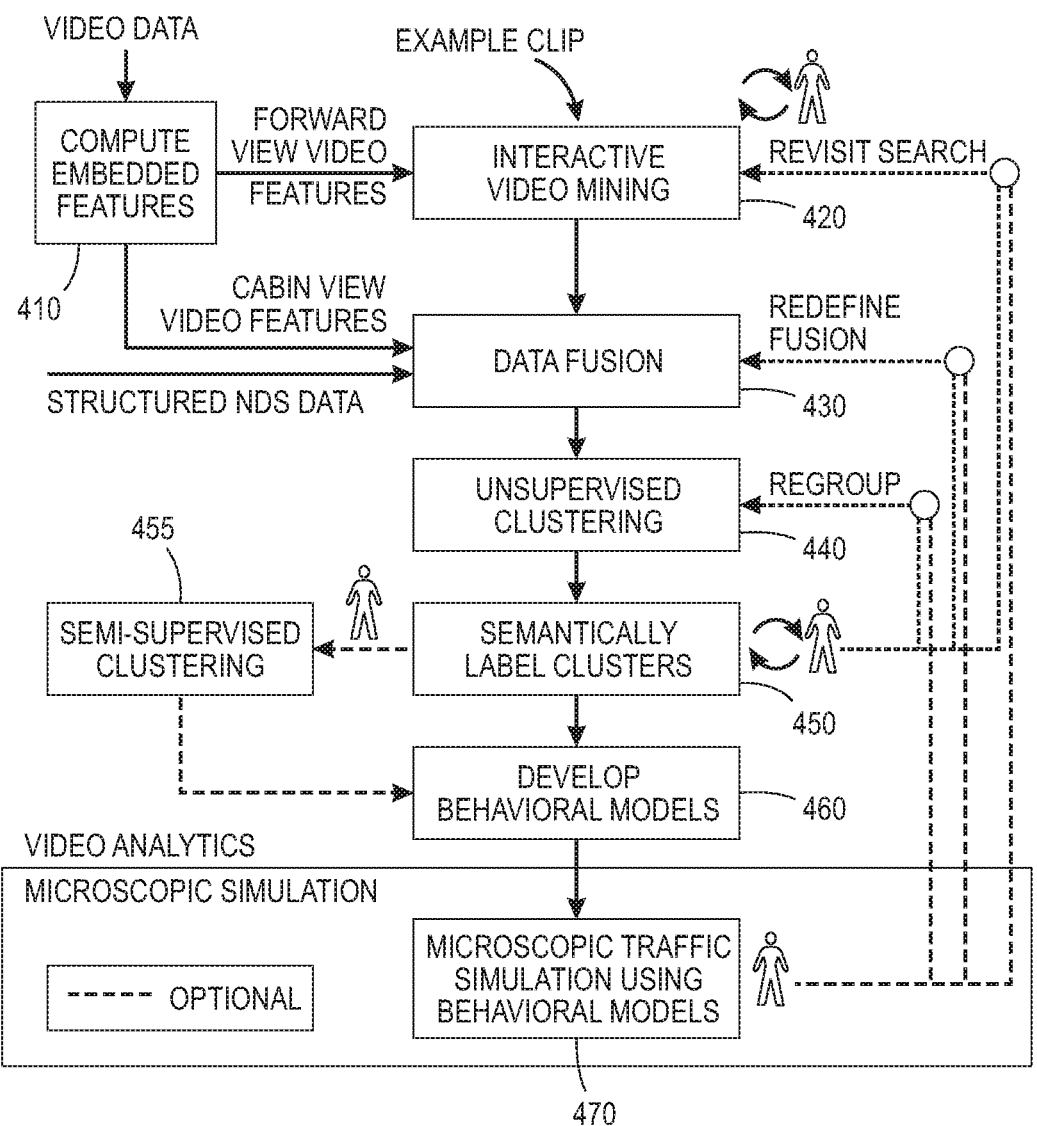
FIG. 4 illustrates an example analytics pipeline in accordance with embodiments described herein.

Embodiments described herein may be used as a part of an agile human-machine collaboration approach for video analytics to support modeling of driver behavior. An example analytics pipeline is shown in FIG. 4. Deep learning embedded feature vectors are computed 410 for at least a portion of video clips in a video dataset. In the vehicle-following example described above, a user, e.g., a transportation expert may start by providing a forward-view video that depicts a scenario of interest. This example triggers an interactive search loop in 420 which returns a sample of similar forward-view clips. The expert provides feedback to refine the search. Once the sample of forward-view videos matches what the expert has in mind, all matches from the dataset of interest are found. Using the timestamps of the matches, a query using the deep learning embedded features for corresponding cabin video can be performed, as well as queries of associated tabular data, such as data acquired in naturalistic driving studies such as the Strategic Highway Research Program 2 (SHRP2) Naturalistic Driving Study (NDS). The results of these queries can be fused in 430. The goal of this data fusion step is to increase the understanding of high-level behavior. In addition to embedded features from multiple video views, lower-level video behavior classes that can be readily determined using existing computer vision algorithms could also be computed and incorporated into the data fusion.

Next, the expert engages in an interactive clustering loop 440 to discover and group subsets of high level behaviors that the expert considers important, iterating as needed. If the groups presented by the system are not useful, the expert redirects the clustering algorithm either by adjusting its parameters (e.g., the number of clusters) or revisiting the initial video search with revised ideas about what videos to include and/or what videos to exclude. If the expert finds useful categories and has specific suggestions for breaking them down further, the expert may present them to a semi-supervised clustering loop 455 to refine the grouping. For semi-supervised learning, the expert will label samples in the clusters of interest. Once the clustering step converges, the expert will provide 450 semantic descriptions for each cluster. The descriptions will then be associated with the respective cluster and stored.

As an exemplary embodiment, the unsupervised learning 440 may cluster data fusion results for following a large truck, and one of the clusters learned in 440 may be for following a large truck while holding an object near the head and keeping a large separation. The expert may notice that some examples are of phones being held near the head and others are of food being eaten. The judgment of the expert could be that the cluster should be broken down into one for holding a phone and another for eating food. The expert may label a small number of examples of both and then submit that cluster for semi-supervised learning. In other various embodiments, the expert may decide to develop a behavioral model for broader classes and therefore not perform semi-supervised learning to further break down clusters learned in 440. The unsupervised clustering 440 and subsequent semantic labeling 450, with or without further semi-supervised clustering 455, may be used to develop 460 behavioral models of driver behavior, for example.

The clustering step can leverage predictive features from sources other than video that the expert specifies, such as kinematic data, radar data, vehicle dynamics models, road condition data, and/or low-level behaviors computed using known computer vision methods. In some cases, a cluster can be broken down further using semi-supervised learning, which only requires light labeling by the user. The final groupings model the behavioral classes of interest to the expert. According to the above example, one behavior the unsupervised learning discovers and models might be following a truck while talking on the phone and keeping a large separation from the truck, while another behavior might be following closer with a lot of stepping on the brake pedal.

For the example of a vehicle following a truck, a different pre-trained deep net may be used for cabin video versus outward-directed video, such as one that focuses primarily on head and facial action. The process of vehicle-following is modeled in terms of motion, factored in with collision avoidance, and vehicle dynamics. In particular, the impact of truck following and driver distraction on driver vehicle-following behavior can be modeled. The impact of various conditions can be ascertained. For example, the impact of a car following car and/or a car following a truck while the driver is engaged in a secondary task can be determined using embodiments described herein. The driver perception-reaction time may be computed. Driver vehicle-following models that reflect these conditions may then be developed, calibrated, and incorporated in a microscopic traffic simulation environment to quantify the network-wide impacts of such behavior.

EXAMPLES

FIG. 5A shows an example graphical user interface for performing an agile video search in accordance with embodiments described herein. The user selects 510 a video data set in which the reference video clip is stored. The user then selects 515 a reference video. The user then selects 520 a particular time that an action of interest occurs in the reference video or video clip. According to various configurations, the system uses the selected time in the reference video plus a predetermined additional time after and/or before the selected time to create a reference user clip. The user can provide a query name 525. The user then may select 530 the video dataset over which to perform the search. The selected video dataset may be the same dataset or a different dataset than the dataset that the reference video is stored. The user can then select 535 a maximum number of matches to return for validation in steps like 140 of FIG. 1 and/or 240 of FIG. 2. Optionally, the user can also provide 540 notes for the particular search.

Figure 5B:
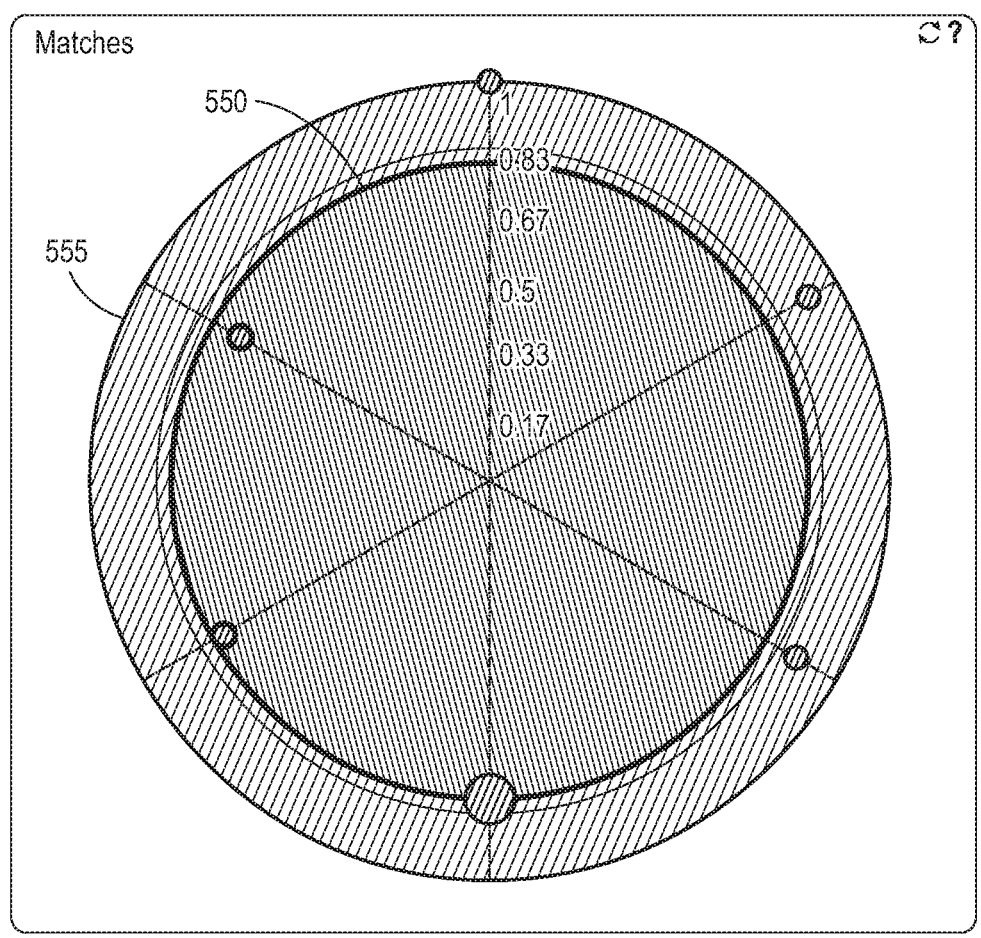
FIGS. 5B-5D illustrate example search results that are presented to the user for feedback in accordance with various embodiments described herein.
Figure 5C:
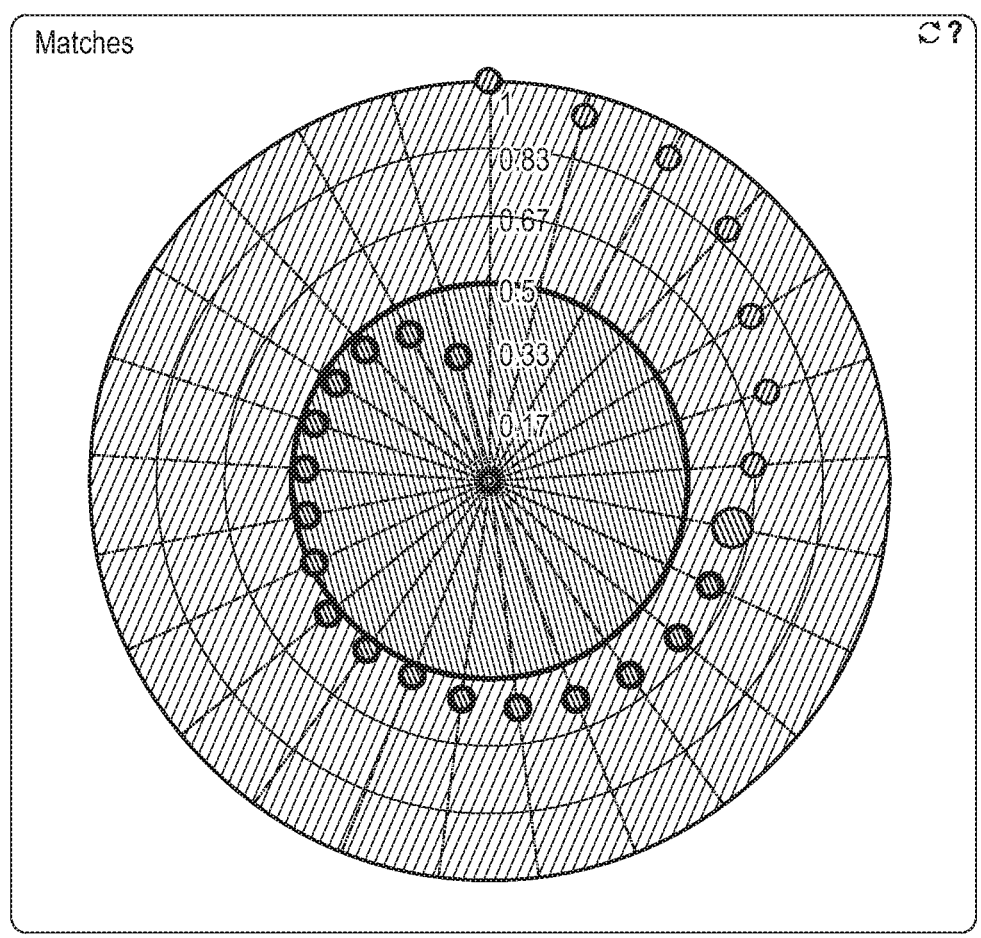
Figure 5D:
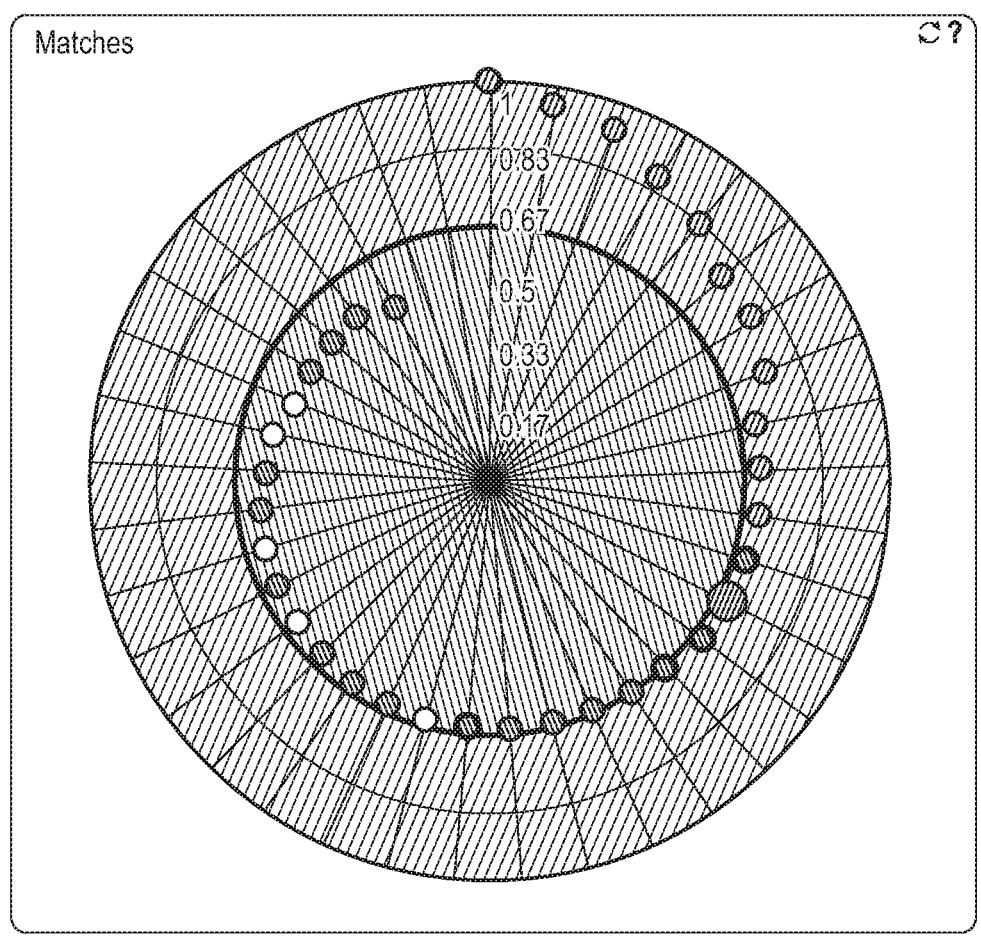

FIGS. 5B-5D illustrate example search results that are presented to the user for feedback, using one possible graphical way to present results. FIG. 5B shows results after the first search. In this example, the circles within 550 are considered misses and circles outside of 550 and within 555 are considered matches. The user can then click on each individual circle to view the corresponding video clip. The user can then indicate whether the video search system had the correct result. In this example, the user determined that both clips that were determined to be misses were actually matches, hence the circles are filled with green. Based on the users input, the system performs a new search and presents the updated results to the user. FIG. 5C shows the returned results for the second round of an example search. In this example, a majority of the suggested matches were actually determined to be misses, and have therefore been filled in with red by the user. This information is used to perform a third round of searching as shown in FIG. 5D. In this example, there were eleven validated matches with only two that were determined by the user to be misses mixed in. At this point, the user may determine that the search is reasonably accurate and decide to end the search. While FIGS. 5B-5D illustrate results shown in a particular way, it is to be understood that the results can be shown in any reasonable way to the user. For example, the results may be shown to the user in the form of a list of videos, or a histogram with bins for pre-defined score ranges.

Figure 6:
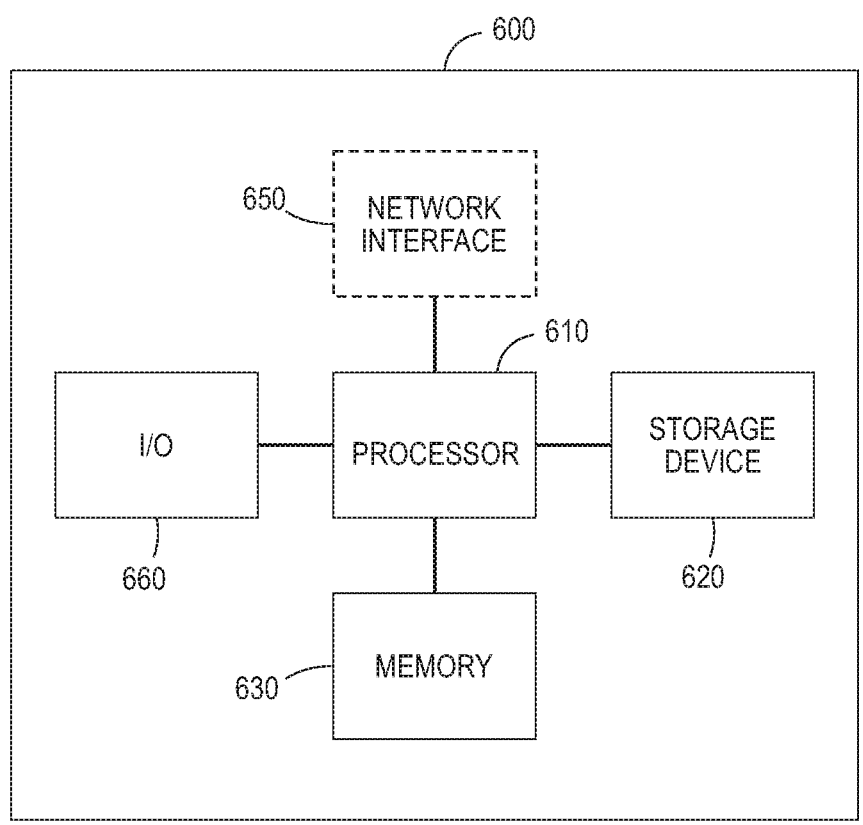
FIG. 6 shows a block diagram of a system capable of implementing embodiments described herein.

The above-described methods can be implemented on a computer using well-known computer processors, memory units, storage devices, computer software, and other components. A high-level block diagram of such a computer is illustrated in FIG. 6. Computer 600 contains a processor 610, which controls the overall operation of the computer 600 by executing computer program instructions which define such operation. It is to be understood that the processor 610 can include any type of device capable of executing instructions. For example, the processor 610 may include one or more of a central processing unit (CPU), a graphical processing unit (GPU), a field-programmable gate array (FPGA), and an application-specific integrated circuit (ASIC). The computer program instructions may be stored in a storage device 620 (e.g., magnetic disk) and loaded into memory 630 when execution of the computer program instructions is desired. Thus, the steps of the methods described herein may be defined by the computer program instructions stored in the memory 630 and controlled by the processor 610 executing the computer program instructions. According to various implementations, the computer may perform method steps as part of an in-house server or cloud based service. The computer 600 may include one or more network interfaces 650 for communicating with other devices via a network. The computer 600 also includes other input/output devices 660 that enable user interaction with the computer 600 (e.g., display, keyboard, mouse, speakers, buttons, etc.). According to various embodiments, FIG. 6 is a high level representation of possible components of a computer for illustrative purposes and the computer may contain other components.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments that can be used to facilitate ink jet ejector diagnostics as described above.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not with the detailed description.

What is claimed is:

1. A method comprising:
receiving a user object specified by a user;
computing a similarity score using a similarity function between the user object and one or more candidate objects in a database based on respective feature vectors;
presenting to the user a first subset of the one or more candidate objects based on the respective computed similarity scores;
receiving from the user first feedback about the first subset of candidate objects;
adjusting the similarity function based on the received first feedback;
presenting to the user a second subset of candidate objects based on the adjusted similarity function; and
receiving from the user second feedback about the second set of candidate objects.

2. The method of claim 1, further comprising adjusting the adjusted similarity function based on the received second feedback.

3. The method of claim 2, further comprising, iteratively repeating the steps of claim 2 until a predetermined event occurs.

4. The method of claim 3, wherein iteratively repeating the steps of claim 2 until a predetermined event occurs comprises iteratively repeating the steps of claim 2 until a notification is received from the user to complete.

5. The method of claim 1, further comprising:
for each candidate object:
determining whether the similarity score is less than a current threshold, the current threshold based on the similarity function;
determining if the similarity score is greater than or equal to a predetermined limit;
if it is determined that the similarity score is less than the current threshold and greater than or equal to the predetermined limit, requesting input from a user regarding the similarity of the candidate object.

6. The method of claim 1, wherein the user object is one or more of a video clip, an image, and a text object.

7. The method of claim 1, wherein computing the similarity score further comprises computing an ensemble average based on the respective feature vectors.

8. The method of claim 1, wherein the feature vectors comprise a plurality of triplets.

9. The method of claim 1, wherein computing the similarity score comprises determining dot products of respective feature vectors of the one or more candidate objects and the user object.

10. The method of claim 1, further comprising determining whether the similarity score is greater than or equal to a predetermined threshold, if it is determined that the similarity score is greater than or equal to the predetermined threshold, clustering the plurality of candidate objects.

11. A system comprising:
a processor; and
a memory storing computer program instructions which when executed by the processor cause the processor to perform operations comprising:
receiving a user object specified by a user;
computing a similarity score using a similarity function between the user object and one or more candidate objects in a database based on respective feature vectors;
presenting to the user a first subset of the one or more candidate objects based on the respective computed similarity scores;
receiving from the user first feedback about the first subset of candidate objects;
adjusting the similarity function based on the received first feedback;
presenting to the user a second subset of candidate objects based on the adjusted similarity function; and
receiving from the user second feedback about the second set of candidate objects.

12. The system of claim 11, wherein the processor is further configured to adjust the adjusted similarity function based on the received second feedback.

13. The system of claim 12, wherein the processor is further configured to iteratively repeat the steps of claim 12 until a predetermined event occurs.

14. The system of claim 11, wherein the user object is one or more of a video clip, an image, and a text object.

15. The system of claim 11, wherein the processor is configured to compute feature vectors for the one or more candidate objects.

16. The system of claim 11, wherein the processor is configured to compute the similarity score by determining dot products of respective feature vectors of the one or more candidate objects and the user object.

17. The system of claim 11, wherein the processor is further configured to:
determine whether the similarity score is greater than or equal to a predetermined threshold; and
if it is determined that the similarity score is greater than or equal to the predetermined threshold, cluster the plurality of candidate objects.

18. The system of claim 11, wherein the processor is further configured to compute an ensemble average based on the respective feature vectors and compute the similarity score based on the ensemble average.

19. A non-transitory computer readable medium storing computer program instructions, the computer program instructions when executed by a processor cause the processor to perform operations comprising:
receiving a user object from a user;
computing a similarity score using a similarity function between the user object and one or more candidate objects in a database based on respective feature vectors;
presenting to the user a first subset of the one or more candidate objects based on the respective computed similarity scores;
receiving from the user first feedback about the first subset of candidate objects;
adjusting the similarity function based on the received first feedback; presenting to the user a second subset of candidate objects based on the adjusted similarity function; and
receiving from the user second feedback about the second set of candidate objects.

20. The non-transitory computer readable medium of claim 19, wherein the computer program instructions when executed by a processor cause the processor to further perform operations comprising adjusting the adjusted similarity function based on the received second feedback.

21. The non-transitory computer readable medium of claim 20, wherein the computer program instructions when executed by a processor cause the processor to further perform operations comprising iteratively repeating the steps of claim 19 until a predetermined event occurs.

\* \* \* \* \*